United States Patent [19]

Norton et al.

[11] Patent Number: 5,538,380

[45] Date of Patent: Jul. 23, 1996

[54] METALLIC NUT FOR USE WITH CERAMIC THREADS

[75] Inventors: Paul F. Norton, San Diego, Calif.; James E. Shaffer, Maitland, Fla.

[73] Assignee: Solar Turbines Incorporated, San Diego, Calif.

[21] Appl. No.: 265,864

[22] Filed: Jun. 27, 1994

[51] Int. Cl.$^6$ .............................. F16B 37/16; F16B 39/30
[52] U.S. Cl. .......................... 411/436; 411/310; 411/324; 411/947
[58] Field of Search ........................... 411/308–311, 324, 411/427, 436, 916, 917, 947

[56] References Cited

U.S. PATENT DOCUMENTS

| | | | |
|---|---|---|---|
| 2,116,036 | 5/1938 | Money | 411/309 |
| 2,156,169 | 4/1939 | Unke | 411/324 X |
| 2,263,644 | 11/1941 | Pierce | 411/436 X |
| 2,349,651 | 5/1944 | Davis | 411/916 X |
| 3,412,773 | 11/1968 | Breed | 411/310 |

*Primary Examiner*—Neill R. Wilson
*Attorney, Agent, or Firm*—Larry G. Cain

[57] ABSTRACT

A nozzle guide vane assembly has ceramic components therein having a conventional thread thereon including a preestablished pitch and having a preestablished rate of thermal expansion. The nozzle guide vane assembly has a metallic components therein having a preestablished rate of thermal expansion being greater that the rate of thermal expansion of the ceramic components is positioned in a gas turbine engine. The metallic component, a nut, has a thread therein including a plurality of crests being spaced on a pitch equal to that of the ceramic component and has a pair of contacting surfaces extending from the plurality of crests. A notch spirally extends intermediate adjacent ones of the plurality of crests and has a preestablished depth which is at least twice the size of the conventional pitch. Furthermore, the pair of contacting surfaces are in contact with only a portion of the threaded surface of the ceramic components.

19 Claims, 5 Drawing Sheets

Fig_2_
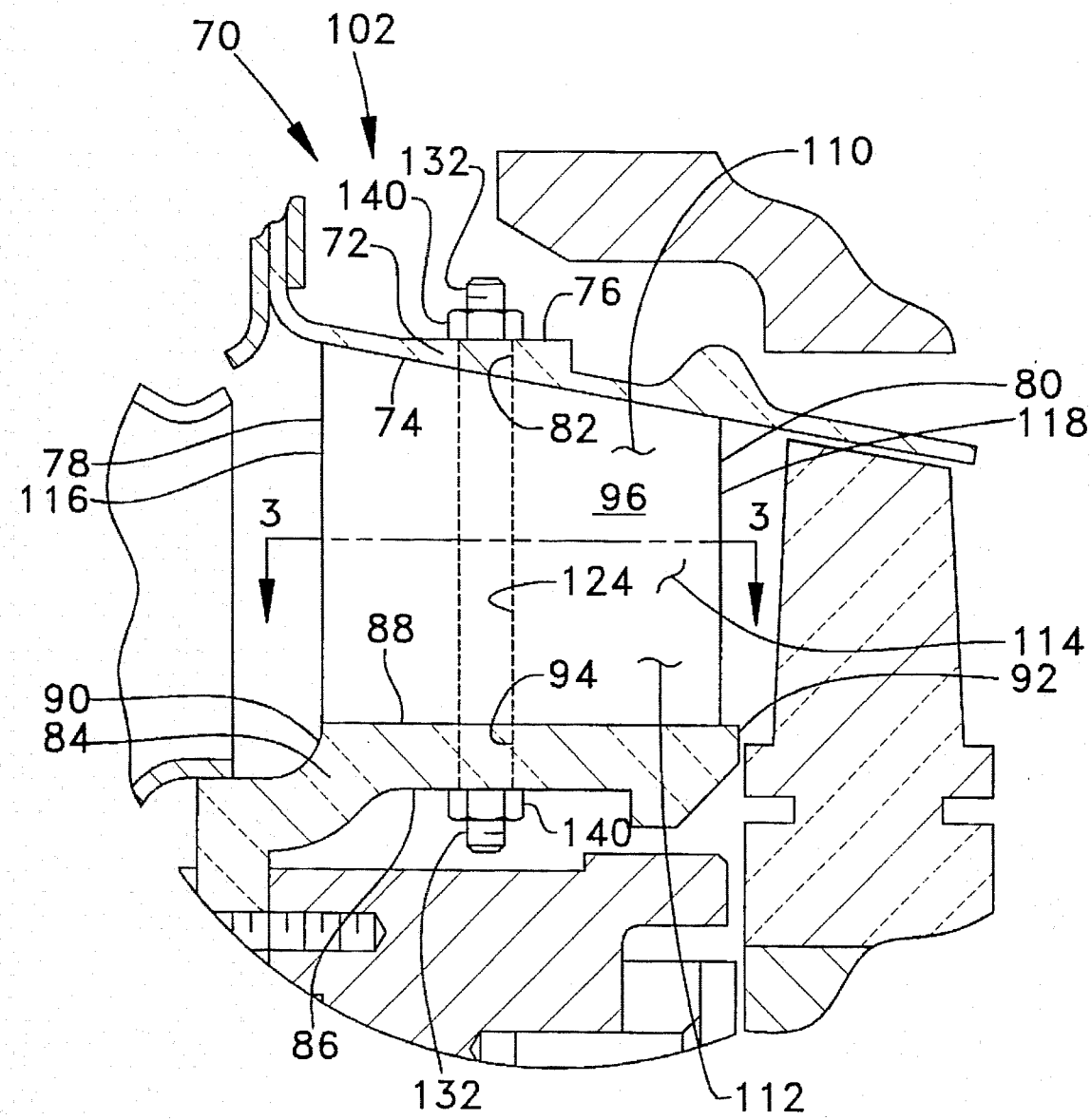

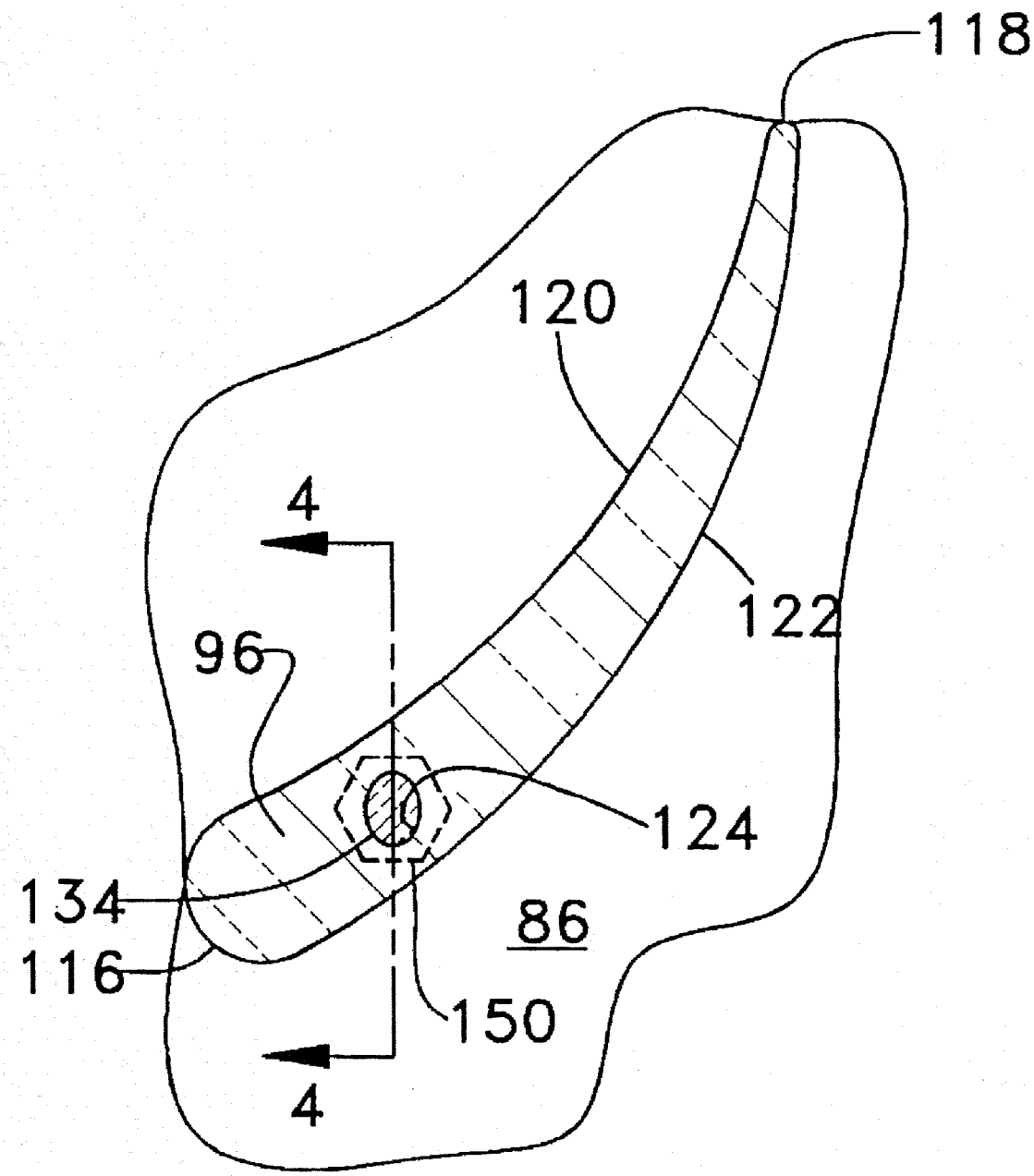
Fig_3_

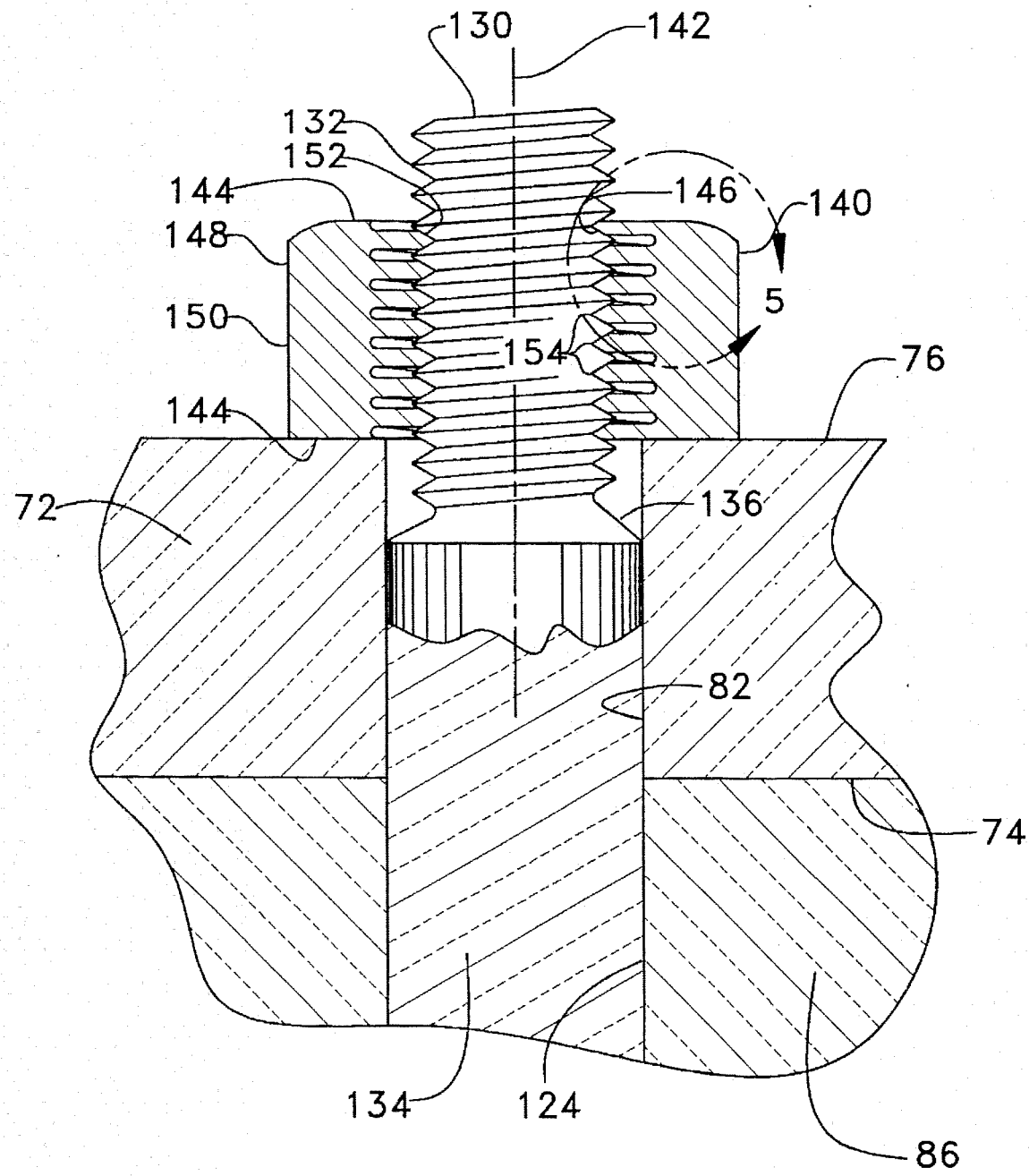
Fig_4_

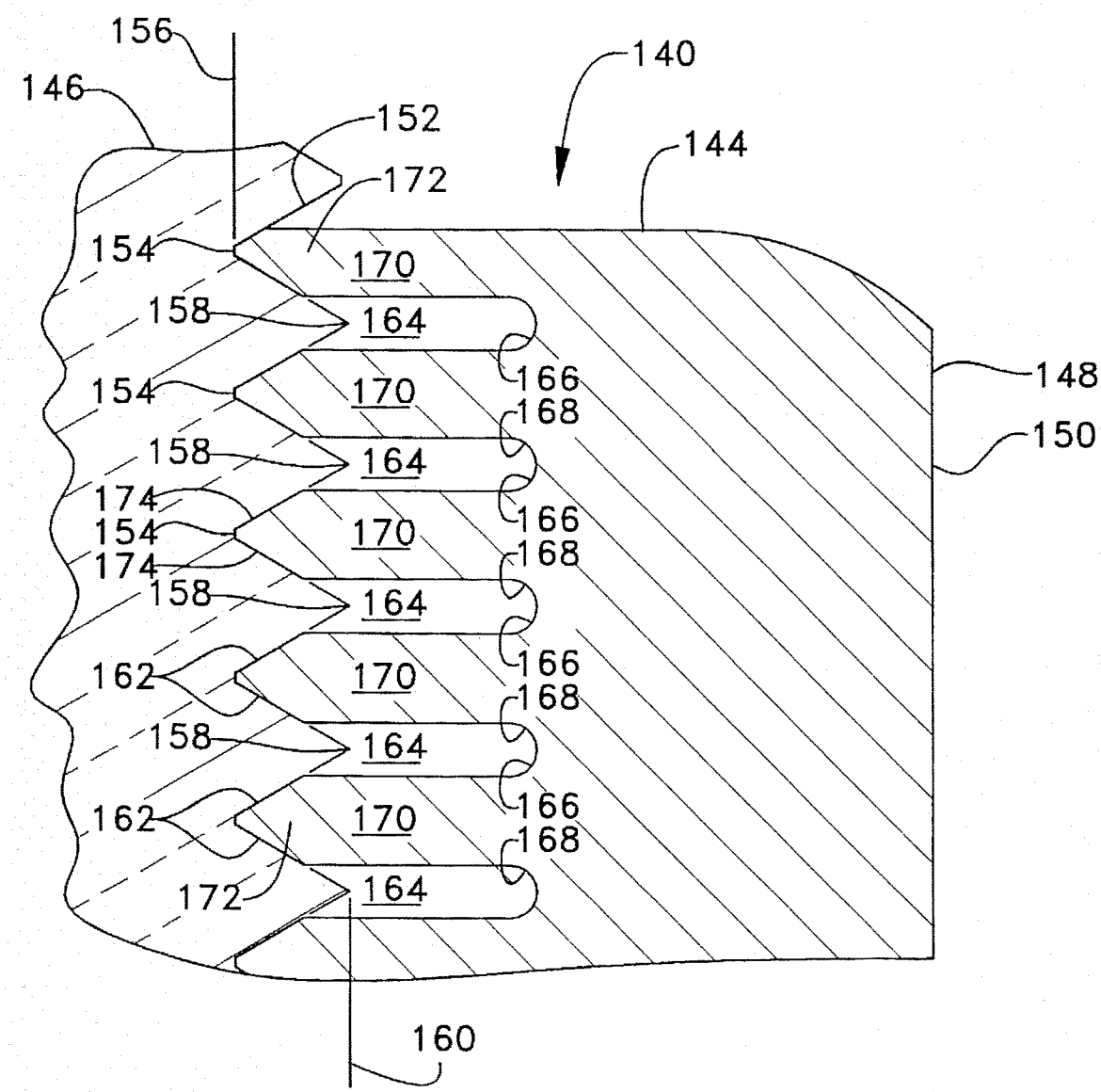
Fig_5_

METALLIC NUT FOR USE WITH CERAMIC THREADS

TECHNICAL FIELD

This invention relates generally to a gas turbine engine and more particularly to a metallic nut for attaching to a ceramic threaded member.

BACKGROUND ART

"The Government of the United States of America has rights in this invention pursuant to Contract No. DE-AC02-92CE40960 awarded by the U.S. Department of Energy."

In operation of a gas turbine engine, air at atmospheric pressure is initially compressed by a compressor and delivered to a combustion stage. In the combustion stage, heat is added to the air leaving the compressor by adding fuel to the air and burning it. The gas flow resulting from combustion of fuel in the combustion stage then expands through a nozzle which directs the hot gas to a turbine, delivering up some of its energy to drive the turbine and produce mechanical power.

In order to increase efficiency, the nozzle has a preestablished aerodynamic contour. The axial turbine consists of one or more stages, each employing one row of stationary nozzle guide vanes and one row of moving blades mounted on a turbine disc. The aerodynamically designed nozzle guide vanes direct the gas against the turbine blades producing a driving torque and thereby transferring kinetic energy to the blades.

The gas typically entering through the nozzle is directed to the turbine at an entry temperature from 850 degrees to at least 1200 degrees Fahrenheit. Since the efficiency and work output of the turbine engine are related to the entry temperature of the incoming gases, there is a trend in gas turbine engine technology to increase the gas temperature. A consequence of this is that the materials, of which the nozzle vanes and blades are made, assume ever-increasing importance with a view to resisting the effects of elevated temperature.

Historically, nozzle guide vanes and blades have been made of metals such as high temperature steels and, more recently, nickel alloys; and it has been found necessary to provide internal cooling passages in order to prevent melting. It has been found that ceramic coatings can enhance the heat resistance of nozzle guide vanes and blades. In specialized applications, nozzle guide vanes and blades are being made entirely of ceramic, thus, imparting resistance to even higher gas entry temperatures.

Ceramic materials are superior to metal in high-temperature strength, but have properties of low fracture toughness, low linear thermal expansion coefficient and high elastic coefficient.

When a ceramic structure is used to replace a metallic part or is combined with a metallic one, it is necessary to avoid excessive thermal stresses generated by uneven temperature distribution or the difference between their linear thermal expansion coefficients. The ceramic's different chemical composition, physical prosperity and coefficient of thermal expansion to that of a metallic supporting structure result in undesirable stresses, a portion of which is thermal stress, which will be set up within the nozzle guide vanes and/or blades and between the nozzle guide vanes and/or blades and their supports when the engine is operating.

Furthermore, conventional nozzle and blade designs which are made from a metallic material are capable of absorbing or resisting these thermal stresses. The chemical composition of ceramic nozzles and blades do not have the characteristic to absorb or resist the thermal stresses. If the stress occurs in a tensile stress zone of the nozzle or blade, a catastrophic failure may occur.

The present invention is directed to overcoming one or more of the problems as set forth above.

DISCLOSURE OF THE INVENTION

In one aspect of the invention, a nut has a preestablished rate of thermal expansion being used for threadedly attaching to a joining member having a preestablished rate of thermal expansion being less than that of the nut. The nut includes a threaded hole having a plurality of crests being spirally connected and a notch spirally extending intermediate adjacent ones of the plurality of crests.

BRIEF DESCRIPTION OF THE DRAWINGS

FIG. 2 is an enlarged sectional view of a portion of the gas turbine engine having a nozzle guide vane assembly as taken within line 2 of FIG. 1;

FIG. 3 is an enlarged sectional view of a portion of the gas turbine engine taken along lines 3—3 of FIG. 2;

FIG. 4 is an enlarged section view of a portion of the gas turbine engine taken along lines 4—4 of FIG. 3; and FIG. 5 is an enlarged sectional view of a portion of a nut.

BEST MODE FOR CARRYING OUT THE INVENTION

Figure 1:
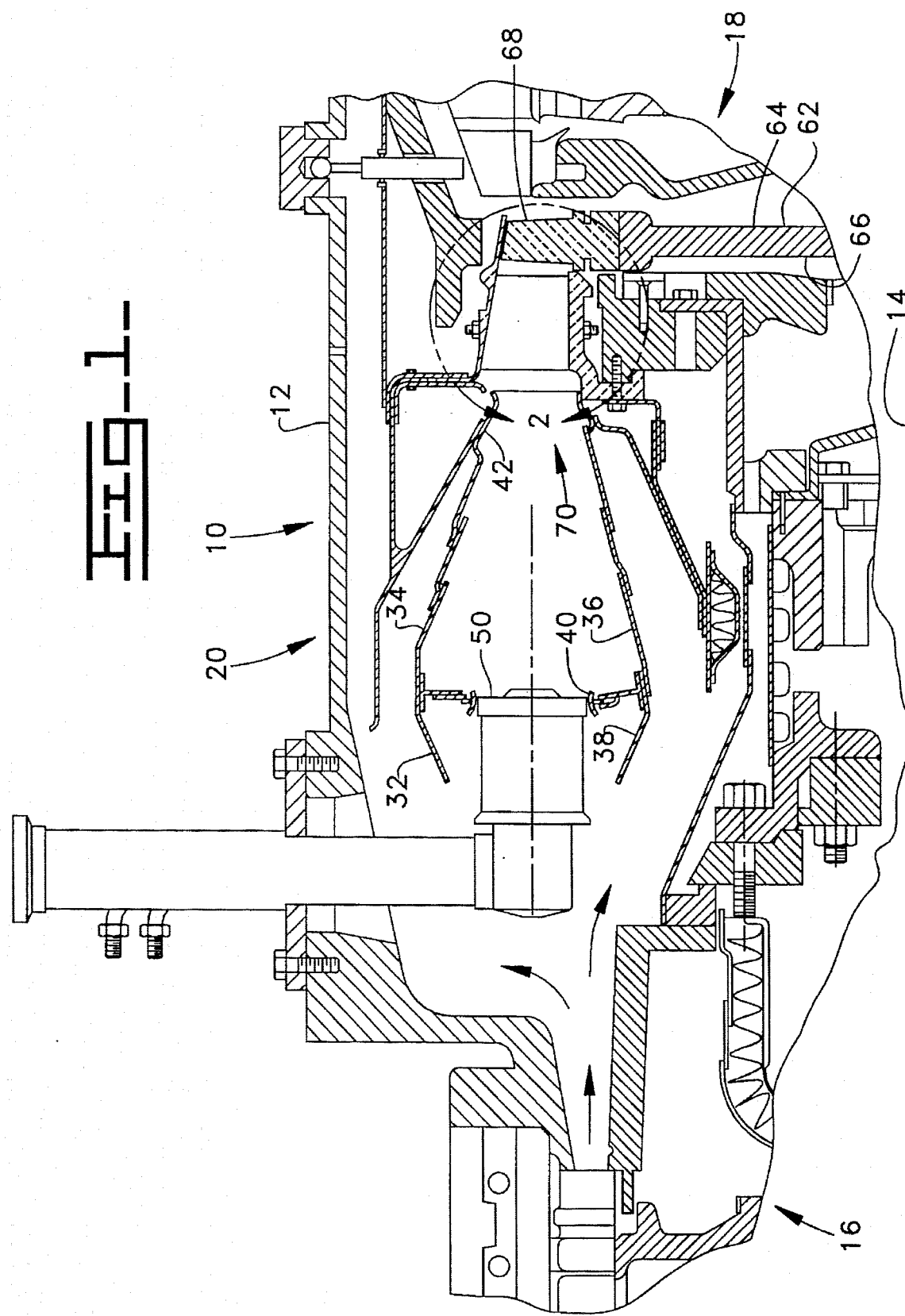
FIG. 1 is a partial side view of a gas turbine engine embodying the present invention with portions shown in section for illustration convenience.

Referring to FIG. 1, a gas turbine engine 10 is shown. The gas turbine engine 10 has an outer housing 12 having a central axis 14. Positioned in the housing 12 and centered about the axis 14 is a compressor section 16, a turbine section 18 and a combustor section 20 positioned operatively between the compressor section 16 and the turbine section 18.

When the engine 10 is in operation, the compressor section 16, which in this application includes an axial staged compressor 22 or, as an alternative, a radial compressor or any source for producing compressed air, causes a flow of compressed air which has at least a part thereof communicated to the combustor section 20 and another portion used for cooling components of the gas turbine engine 10. The combustor section 20, in this application, includes an annular combustor 32. The combustor 32 has a generally cylindrical outer shell 34 being coaxially positioned about the central axis 14, a generally cylindrical inner shell 36, an inlet end 38 having a plurality of generally evenly spaced openings 40 therein and an outlet end 42. In this application, the combustor 32 is constructed of a plurality of generally conical segments 44. Each of the openings 40 has an injector 50 positioned therein. As an alternative to the annular combustor 32, a plurality of can type combustors could be incorporated without changing the essence of the invention.

The turbine section 18 includes a power turbine 60 having an output shaft, not shown, connected thereto for driving an accessory component, such as a generator. Another portion of the turbine section 18 includes a gas producer turbine 62 connected in driving relationship to the compressor section 16. The gas producer turbine 62 includes a turbine assembly 64 being rotationally positioned about the central axis 14. The turbine assembly 64 includes a disc 66 having a plurality of blades 68 attached therein in a conventional manner.

As best shown in FIGS. 2 and 3, positioned adjacent the outlet end 42 of the combustor 32 and in flow receiving communication therewith is a nozzle guide vane assembly 70. The nozzle guide vane assembly 70 is primarily made of a ceramic material having a relative low rate of thermal expansion as compared to the metallic components of the engine 10. The nozzle guide vane assembly 70 includes an outer shroud 72 defining a radial inner surface 74, a radial outer surface 76, a first end 78 being spaced from the outlet end 42 of the combustor 32 a predetermined distance and a second end 80. As best shown in FIG. 4, a plurality of radial holes 82 extend through the inner surface 74 and the outer surface 76 and are circumferentially positioned about the outer shroud 72. In this application, each of the plurality of holes 82 has a generally oval configuration. The nozzle guide vane assembly 70 further includes an inner shroud 84 defining a radial inner surface 86, a radial outer surface 88, a first end 90 being generally spaced from the outlet end 42 of the combustor 32 a predetermined distance and a second end 92. A plurality of radial holes 94 extend through the inner surface 86 and the outer surface 88 and are circumferentially positioned about the inner shroud 84. In this application, each of the plurality of holes 94 has an oval configuration which generally matches the oval configuration of the plurality of holes 82 in the outer shroud 72. A plurality of vanes 96 are interposed the radial inner surface 74 of the outer shroud 72 and the radial outer surface 88 of the inner shroud 84. In this application, the outer shroud 72, the inner shroud 84 and the plurality of vanes 96 are connected one to another.

A means 102 for attaching the nozzle guide vane assembly 70 to the gas turbine engine 10 in a conventional manner is provided.

In this application, each of the plurality of vanes 96 is interposed the outer shroud 72 and the inner shroud 84 and has a generally solid vane configuration. Each of the plurality of vanes 96 define a first end portion 110 adjacent the inner surface 74 of the outer shroud 72, a second end portion 112 adjacent the outer surface 88 of the inner shroud 84 and a central portion 114 intermediate the first and second end portions 110, 112. As further shown in FIGS. 2 and 3, each of the plurality of vanes 96 includes a leading edge portion 116 positioned adjacent the outlet end 42 of the combustor 32 and a trailing edge portion 118 positioned adjacent the turbine assembly 64. Interposed the leading edge portion 116 and the trailing edge portion 118 is a pressure or concave side 120 and a suction or convex side 122 each having a preestablished thickness. Defined within each of the plurality of vanes 96 intermediate the leading edge portion 116 and the trailing edge portion 118 is a hole 124. The hole 124 has an oval configuration generally matching the oval configuration of each of the plurality of holes 82 in the outer shroud 72 and each of the plurality of holes 94 in the inner shroud 84. The hole 124 extends through the first end portion 110 and the second end portion 112. In this application, each of the plurality of vanes is solid, but as an alternative, each of the plurality of vanes 96 could include a gallery for cooling.

As best shown in FIG. 4, positioned in the hole 124 in each of the plurality of vanes 96 is a joining member 130. The joining member 130 has a pair of threaded ends 132 being spaced apart. Each of the threaded ends 132 has a convention thread thereon having a conventional pitch. For example, in this application a conventional ½ inch diameter end has 13 national course threads per inch machined thereon. Intermediate the pair of threaded ends 132 is a body portion 134 having a generally oval cross section which generally matches the oval configuration of each of the plurality of holes 82 in the outer shroud 72, the hole 124 in each of the plurality of vane 96 and each of the plurality of holes 94 in the inner shroud 84. A blending portion 136 connects each of the pair of ends 132 with the body portion 134.

In the assembled state, the body portion 134 of the joining member 130 extends through the hole 124 in the vane 96 and further at least partially into one of the plurality of holes 72 in the outer shroud 72 and one of the plurality of holes 94 in the inner shroud 84. The oval configuration of the body portion 134 orientates the concave side 120 relative to the outlet end 42 of the combustor 32. The oval configuration of the body portion 134 further prevents rotational movement of each of the plurality of vanes 96 relative to the inner shroud 84 and the outer shroud 72. Each of the pair of ends 132 extends beyond the outer surface 76 of the outer shroud 72 and the inner surface 86 of the inner shroud 84. A nut 140 is threadedly attached to each of the pair of ends 132 and attaches the outer shroud 72, the vane 96 and the inner shroud 84 one to another. The nut 140, in this application, is made of a metallic material such as steel. The nut 140 has a central axis 142, a pair of ends 144 spaced axially apart and has a threaded hole 146 extending between the pair of ends 144 and being centered on the axis 142. An outer portion 148 of the nut is spaced generally radially from the axis 142 and has a gripping surface 150 thereon which, in this application, takes on a generally hexagon configuration. The threads 152 within the threaded hole 146 have a distinct configuration. The threaded hole 146 includes a conventional pitch having a plurality of crests 154 being spirally connected and positioned at an inner diameter 156 of the threads 152, which is centered on the axis 142, a plurality of roots 158, best shown in phantom in FIG. 5, are spirally connected and positioned at an outer diameter 160. The outer diameter 160 is centered on the axis 142. A plurality of contacting portions 162 extend between each of the plurality of crests 154 and the plurality of roots 158 and spirally travel from one of the pair of ends 144 toward the other of the pair of ends 144. Furthermore, the distinct configuration of the threads 152 has a notch 164 having a preestablished depth and a preestablished width. The preestablished width is centered on the root 158. The preestablished depth of the notch 164 is at least twice the pitch of the conventional threads on the joining member 130 and the pitch of the threads 152 in the nut 140. Furthermore, the depth of the notch 164 is at least twice the size of the preestablished size of the width. The notch 164 extends radially outward toward the gripping surface 150 and spirals in alignment with the spiralling root 158. The notch 164 spirally extends intermediate adjacent ones of the plurality of crests 154. A bottom 166 of the notch 164 has a radiused portion 168 therein. In this application, the depth of the notch 164 is at least twice the depth of the convention depth of the threads on the joining member 130. For example, in this application the joining member 130 has a ⅜–16 national course thread thereon. The depth of the notch 164 is 3 times the depth of the conventional ⅜ course threaded member or about 0.162 inches (4.11 mm). And, the width of the notch 164 is about ½ of the conventional threads pitch or about 0.031 inches (0.78 mm). The results of the distinct configuration form a generally cantilevered spiral thread engaging member 170 having an end portion 172 defining a pair of contacting surfaces 174 extending from the crest and including a generally 60 degree angle. The pair of contacting surfaces 174 of the engaging member 170 contact only a portion of the threaded surface of the joining member 130.

INDUSTRIAL APPLICABILITY

In use, the gas turbine engine 10 is started and allowed to warm up and is used in any suitable power application. As the demand for load or power is increased, the engine 10 output is increasing by increasing the fuel and subsequent air resulting in the temperature within the engine 10 increases. In this application, the components used to make up the nozzle guide vane assembly 70, being of different materials and having different rates of thermal expansion, grow at different rates and the forces resulting therefrom and acting thereon must be structurally compensated for to increase life and efficiency of the gas turbine engine. The structural arrangement of the nozzle guide vane assembly 70 being made primarily of a ceramic material requires that the nozzle guide vane assembly 70 be generally isolated from the conventional materials to insure sufficient life of the components.

For example, the means 102 for attaching the nozzle guide vane assembly 70 to the gas turbine engine 10 positions the nozzle guide vane assembly 70 in direct contact and alignment with the hot gases from the combustor 42. Prior to the nozzle guide vane assembly being assembled into the engine 10 the outer shroud 72, the plurality of vanes 96 and the inner shroud are assembled. For example, one of the plurality of holes 82 in the outer shroud 72 is aligned with the hole 124 in one of the plurality of vanes 96 and one of the plurality of holes 94 in the inner shroud 84. One of the nuts 140 is threadedly attached to each of the pair of threaded ends 132 and the plurality of vanes 96. Thus, the nozzle guide vane assembly 70 is completed and ready to be assembled into the engine 10.

Furthermore, during operation of the engine, the heat causes the metallic nuts to thermally expand at a higher rate than that of the ceramic joining member 130. Thus, it is theorized that the distinct configuration of the threads 152 of the nut 140 generally compensates for the difference in thermal expansion between the ceramic material and the metallic material. It is theorized that the generally cantilevered spiral threaded engaging member 170 will flex between the contacting surfaces 174 and the connection near the bottom 166 of the notch 164. It is not necessarily theorized that the member 170 will bow but that the member 170 will be axially displaced from the pair of contacting surfaces 174 to the connection near the bottom 166 of the notch 164. There will, however, be a limited amount of bowing within the cantilevered spiral threaded engaging member 170.

Thus, in view of the foregoing, it is readily apparent that the structure of the present invention results in the interface between the ceramic member, the pair of thread ends 132, and the metallic member, the threads 152 of the nut 140, being effectively attached one to another. The expansion of the ceramic nozzle vane guide assembly 70 and the expansion of the metallic components, the nuts 140, of the gas turbine engine 10 place the interface in a highly compressive state. Thus, avoiding a tensile stress zone of the nozzle guide vane assembly 70 which could result in a catastrophic failure.

Other aspects, objects and advantages of this invention can be obtained from a study of the drawings, the disclosure and the appended claims.

We claim:

1. A nut having a preestablished rate of thermal expansion being used for threadedly attaching to a joining member having a preestablished rate of thermal expansion being less than that of the nut, said nut including a threaded hole having a plurality of crests being spirally connected and a notch spirally extending intermediate adjacent ones of the plurality of crests.

2. The nut of claim 1 wherein said nut is made from a metallic material.

3. The nut of claim 1 wherein said joining member is made from a ceramic material.

4. A nut being used for threadedly attaching to a joining member, said nut including a threaded hole having a plurality of crests being spirally connected and a notch spirally extending intermediate adjacent ones of the plurality of crests, said notch having a preestablished width and a preestablished depth being at least twice that of the preestablished width.

5. The nut of claim 4 wherein said nut includes a pair of contacting surfaces extending from the plurality of crests.

6. The nut of claim 5 wherein said contacting surfaces include an angle of about 60 degrees therebetween.

7. The nut of claim 6 wherein said contacting surfaces are in contact with only a portion of the threads on the joining member.

8. The nut of claim 1 wherein said notch has a preestablished width and a preestablished depth being at least twice that of the pitch of the threads.

9. The nut of claim 4 wherein said nut is made from a metallic material.

10. The nut of claim 4 wherein said joining member is made from a ceramic material.

11. The nut of claim 4 wherein said contacting surfaces include an angle of about 60 degrees therebetween.

12. The nut of claim 11 wherein said contacting surfaces are in contact with only a portion of the threads on the joining member.

13. The nut of claim 4 wherein said notch has a preestablished width and a preestablished depth being at least twice that of the pitch of the threads.

14. A nut being used for threadedly attaching to a joining member, said nut including a threaded hole having a plurality of crests being spirally connected and a notch spirally extending intermediate adjacent ones of the plurality of crests, said notch having a preestablished width and a preestablished depth being at least twice that of the pitch of the threads.

15. The nut of claim 14 wherein said nut includes a pair of contacting surfaces extending from the plurality of crests.

16. The nut of claim 14 wherein said nut is made from a metallic material.

17. The nut of claim 14 wherein said joining member is made from a ceramic material.

18. The nut of claim 14 wherein said contacting surfaces include an angle of about 60 degrees therebetween.

19. The nut of claim 18 wherein said contacting surfaces are in contact with only a portion of the threads on the joining member.

* * * * *